(12) United States Patent
Okada et al.

(10) Patent No.: US 8,948,970 B2
(45) Date of Patent: Feb. 3, 2015

(54) ELECTRIC POWER STEERING APPARATUS

(75) Inventors: Shinji Okada, Gunma (JP); Hideyuki Kobayashi, Gunma (JP); Naoki Sawada, Gunma (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 13/380,999

(22) PCT Filed: Nov. 4, 2011

(86) PCT No.: PCT/JP2011/075379
§ 371 (c)(1),
(2), (4) Date: May 1, 2012

(87) PCT Pub. No.: WO2012/137380
PCT Pub. Date: Oct. 11, 2012

(65) Prior Publication Data
US 2012/0259512 A1  Oct. 11, 2012

(30) Foreign Application Priority Data

Apr. 7, 2011  (JP) .................................. 2011-085470

(51) Int. Cl.
*B62D 6/00* (2006.01)
*B62D 11/00* (2006.01)
(Continued)

(52) U.S. Cl.
CPC ............ *B62D 5/0469* (2013.01); *B62D 5/0481* (2013.01)
USPC ................... 701/41; 701/36; 701/42; 701/43; 180/6.2; 180/443

(58) Field of Classification Search
CPC .... B62D 15/0285; B62D 17/00; B62D 5/046; B62D 1/16; B62D 6/001; B62D 5/008; B60W 2050/0089; B60W 10/20; B60W 30/12; B60W 40/06; B60K 17/3462; B60K 17/10; B60K 7/15; B60K 41/00
USPC ................. 701/41, 42, 36, 48, 51, 61, 80, 91; 180/446, 402, 443, 444, 6.2, 410, 422, 180/6.28; 318/434; 340/686.1
See application file for complete search history.

(56) References Cited

U.S. PATENT DOCUMENTS 6,026,926 A * 2/2000 Noro et al. .................... 180/446
6,266,591 B1 * 7/2001 Wilson-Jones et al. ......... 701/41
(Continued)

FOREIGN PATENT DOCUMENTS

JP       6-4417 B2    1/1994
JP    2005082119 A    3/2005
(Continued)

OTHER PUBLICATIONS

International Search Report of PCT/JP2011/075379; Jan. 24, 2012.

*Primary Examiner* — Calvin Cheung
*Assistant Examiner* — Luis A Martinez Borrero
(74) *Attorney, Agent, or Firm* — Sughrue Mion, PLLC

(57) ABSTRACT

[Problem]
An object of the present invention is to provide an electric power steering apparatus that realizes weight saving and downsizing of component parts by counting and controlling the number of times of end hitting and simultaneously calculating a current limit value depending on the number of times of end hitting to limit assist.
[Means for solving the problem]
The present invention is an electric power steering apparatus that comprises an end hitting detection means that detects end hitting based on the steering torque and a differential steering torque obtained by differentiating the steering torque and outputs an end hitting detection signal, a counting means that counts a number 1 of times of end hitting detected by the end hitting detection means, a storage means that stores and keeps a total number of times of end hitting, and a current limit value calculating means that calculates a current limit value depending on a number 2 of times of end hitting obtained by adding the number 1 of times of end hitting from the counting means and the total number of times of end hitting from the storage means, wherein the current command value is limited based on the current limit value calculated by the current limit value calculating means.

13 Claims, 9 Drawing Sheets

(51) Int. Cl.
B62D 12/00 (2006.01)
B62D 5/04 (2006.01)

(56) References Cited

U.S. PATENT DOCUMENTS

| | | | | |
|---|---|---|---|---|
| 6,354,396 | B1* | 3/2002 | Horton et al. | 180/446 |
| 6,694,237 | B2* | 2/2004 | Kifuku et al. | 701/41 |
| 6,731,085 | B2* | 5/2004 | Sardar et al. | 318/434 |
| 6,995,679 | B2* | 2/2006 | Eskritt et al. | 340/686.1 |
| 7,236,907 | B2* | 6/2007 | Kaster et al. | 702/151 |
| 7,937,219 | B2* | 5/2011 | Ichinose et al. | 701/301 |
| 8,272,474 | B2* | 9/2012 | Mori et al. | 180/446 |
| 2003/0045981 | A1* | 3/2003 | Kifuku et al. | 701/41 |
| 2003/0069675 | A1* | 4/2003 | Kifuku et al. | 701/41 |
| 2005/0071061 | A1* | 3/2005 | Kato et al. | 701/41 |
| 2005/0205345 | A1* | 9/2005 | Hayashi | 180/446 |
| 2006/0042864 | A1* | 3/2006 | Ovshinsky | 180/447 |
| 2008/0142293 | A1* | 6/2008 | Goto et al. | 180/446 |
| 2008/0185213 | A1* | 8/2008 | Mori et al. | 180/402 |
| 2008/0271942 | A1* | 11/2008 | Yamashita et al. | 180/443 |
| 2010/0138109 | A1* | 6/2010 | Wang et al. | 701/41 |
| 2010/0204889 | A1* | 8/2010 | Watanabe et al. | 701/42 |
| 2010/0250068 | A1* | 9/2010 | Yamazaki | 701/41 |
| 2011/0024224 | A1* | 2/2011 | Mori et al. | 180/446 |
| 2011/0035114 | A1* | 2/2011 | Yoneda et al. | 701/42 |
| 2012/0191301 | A1* | 7/2012 | Benyo et al. | 701/41 |
| 2012/0191302 | A1* | 7/2012 | Sternecker et al. | 701/41 |
| 2012/0215406 | A1* | 8/2012 | Tanimoto et al. | 701/42 |

FOREIGN PATENT DOCUMENTS

| | | |
|---|---|---|
| JP | 2007290662 A | 11/2007 |
| JP | 2008080967 A | 4/2008 |
| JP | 2009154598 A | 7/2009 |
| JP | 2009274692 A | 11/2009 |

* cited by examiner

PRIOR ART

PRIOR ART

PRIOR ART

ELECTRIC POWER STEERING APPARATUS

CROSS REFERENCE TO THE RELATED APPLICATIONS

This application is a National Stage of International Application No. PCT/JP2011/075379, filed on Nov. 4, 2011, which claims priority from Japanese Patent Application No. 2011-085470,filed on Apr. 7,2011, the contents of all of which are incorporated herein by reference in their entirety.

TECHNICAL FIELD

The present invention relates to a column assist type electric power steering apparatus that provides a steering system of a vehicle with a steering assist force generated by a motor, and in particular to an electric power steering apparatus that comprises an intermediate shaft and reduces impact loads to act on a steering mechanism such as the intermediate shaft and so on during end hitting of steering operations.

BACKGROUND ART

An electric power steering apparatus that energizes a steering apparatus of a vehicle by using a rotational torque of a motor as an assist torque, applies a driving force of the motor as the assist torque to a steering shaft or a rack shaft by means of a transmission mechanism such as gears or a belt through a reduction mechanism. In order to accurately generate the assist torque (the steering assist force), such a conventional electric power steering apparatus performs a feedback control of a motor current. The feedback control adjusts a voltage supplied to the motor so that a difference between a current command value and a detected motor current value becomes small, and the adjustment of the voltage applied to the motor is generally performed by an adjustment of a duty ratio of a PWM (Pulse Width Modulation) control.

A general configuration of an electric power steering apparatus will be described with reference to FIG. 1. As shown in FIG. 1, a column shaft (a steering shaft) 2 connected to a steering wheel (a handle) 1, is connected to steered wheels 8L and 8R through reduction gears 3, universal joints 4a and 4b, a rack and pinion mechanism 5, and tie rods 6a and 6b, further via hub units 7a and 7b. Further, the column shaft 2 is provided with a torque sensor 10 for detecting the steering torque of the steering wheel 1, and a motor 20 for assisting the steering force of the steering wheel 1 is connected to the column shaft 2 through the reduction gears 3. Electric power is supplied to a control unit 100 for controlling the electric power steering apparatus from a battery 14, and an ignition key signal is inputted into the control unit 100 through an ignition key 11. The control unit 100 calculates a current command value of an assist (steering assist) command based on a steering torque T detected by the torque sensor 10 and a velocity V detected by a velocity sensor 12, and controls a current supplied to the motor 20 based on a current control value E obtained by performing compensation and so on with respect to the current command value. Furthermore, it is also possible to receive the velocity V from a CAN (Controller Area Network) and so on.

The control unit 100 mainly comprises a CPU (or an MPU or an MCU), and general functions performed by programs within the CPU are shown in FIG. 2.

Functions and operations of the control unit 100 will be described with reference to FIG. 2. As shown in FIG. 2, the steering torque T detected by the torque sensor 10 and the velocity V from the velocity sensor 12 are inputted into a current command value calculating section 101, and the current command value calculating section 101 calculates a current command value Iref1 based on the steering torque T and the velocity V. The steering torque T, a motor angular velocity $\omega$, and a motor angular acceleration $\omega^*$ are inputted into a torque compensation section 110, and a torque compensation value Cm is calculated. The current command value Iref1 calculated by the current command value calculating section 101, is phase-compensated by a phase compensation section 102 for enhancing stability of the steering system. A current command value Iref2 phase-compensated by the phase compensation section 102, and the torque compensation value Cm calculated by the torque compensation section 110 are inputted into an adding section 103. The adding section 103 outputs a current command value Iref3 that is the result of addition. The current command value Iref3 is inputted into a maximum current value limiting section 104, and the maximum current value limiting section 104 outputs a current command value Iref4 that the maximum is limited.

The current command value Iref4 is inputted into a subtracting section 105, and the subtracting section 105 obtains a deviation (Iref4−i) of the current command value Iref4 and a motor current value "i" that is fed back. The deviation (Iref4−i) is PI-controlled by a PI control section (a proportional-integral control section) 106, and further is inputted into a PWM control section (a Pulse Width Modulation control section) 107 to perform the adjustment of the duty ratio. The PWM control section 107 outputs the current control value E to an inverter 108, and the inverter 108 controls the motor 20 based on the current control value E. The motor current value "i" of the motor 20 is detected by a motor current detection means 21, and is inputted into the subtracting section 105 to be fed back.

The motor 20 is equipped with a rotation sensor 22 such as a resolver and so on, a motor rotation signal $\theta$ from the rotation sensor 22 is inputted into a motor angular velocity calculating section 23, and the motor angular velocity calculating section 23 calculates the motor angular velocity $\omega$ that is a rotational angular velocity of the motor 20. Furthermore, the motor angular velocity $\omega$ is inputted into a motor angular acceleration calculating section 24, and the motor angular acceleration calculating section 24 calculates the motor angular acceleration $\omega^*$ that is a rotational angular acceleration of the motor 20 and outputs the calculated motor angular acceleration $\omega^*$.

For example, the torque compensation section 110 comprises a differential compensation section 112, a convergence control section 113, an inertia compensation section 114, and so on. The differential compensation section 112 outputs a differential steering torque TA obtained by differentiating the steering torque T to enhance the responsibility, the convergence control section 113 outputs a convergence control value Ga based on the motor angular velocity $\omega$, and the convergence control value Ga and the differential steering torque TA are added in an adding section 116. Moreover, the inertia compensation section 114 outputs an inertia compensation value INa based on the motor angular acceleration $\omega^*$, the inertia compensation value INa and an output value of the adding section 116 are added in an adding section 117, and the adding section 117 outputs the torque compensation value Cm to the adding section 103.

The convergence control section 113 applies a brake to a swing operation of the steering wheel in order to improve convergence of the vehicle yaw. The inertia compensation section 114 removes a torque that accelerates or decelerates the motor inertia from the steering torque T, and generates a steering feeling without an inertia feeling.

Here, for solving problems about assembling the steering mechanism and for purposes such as absorbing displacements in an axis direction and vibrations that occur during vehicle running, an intermediate shaft mechanism in which an intermediate shaft comprised of an expansion/contraction shaft is arranged in the middle part of the column shaft 2 of the steering mechanism, is used recently. FIG. 3 shows the appearance of the steering mechanism comprising such an intermediate shaft 4 as corresponding to FIG. 1. As shown in FIG. 3, the motor 20 is installed in a drive mechanism unit 30 that comprises the torque sensor 10, the reduction gears 3 and so on, and the expandable and contractive intermediate shaft 4 is arranged between universal joints 4a and 4b of the middle part of the column shaft 2.

For example, the details of the intermediate shaft 4 are a structure shown in FIG. 4. That is to say, the intermediate shaft 4 comprises an outer tube 41 and an inner shaft 42, the outer tube 41 has a yoke 4b-1 which is welded to an end portion and forms the universal joint 4b, and the inner shaft 42 has a yoke 4a-1 which is welded to an end portion and forms the universal joint 4a. A female spline 43 is formed on an inner peripheral surface of the outer tube 41, on the other hand, a male spline 45 interdigitated with the female spline 43 is formed on an outer peripheral surface of a tip portion 44 of the inner shaft 42. Additionally, main constructional members of the universal joint 4b are the yoke 4b-1, a joint yoke 4b-2 and a spider 4b-3. Further, at least one surface of the female spline 43 and the male spline 45 is coated by a low-friction resin such as a PTFE (polytetrafluoroethylene) or a polyamide resin.

The above-described general electric power steering apparatus is equipped with a rack end mechanism for stopping steering of the steering wheel above a certain level, by steering the steering wheel from the neutral position to right and left given rack end angles respectively, when the steering angle of the steering wheel reaches a maximum steering angle, it becomes impossible to steer the steering wheel in the same direction to an angle more than the maximum steering angle. For this reason, despite the steering wheel is steered to the neighborhood of the rack end angle, when responding to that a large steering torque is applied to the steering wheel and a large steering assist force is applied to the steering apparatus from the motor, there is a possibility that a large shock is applied to the steering mechanism, loud shock noises occur, and damages and deformations of component parts of the steering mechanism occur.

As an apparatus to solve such problems, for example, there has been an apparatus disclosed in Japanese Examined Patent Application Publication No. H6-4417 B2 (Patent Document 1). In the apparatus described in Patent Document 1, after the steering angle of the steering wheel reaches a given angle located to adjacent to the rack end angle, by decreasing a desired current value with an increase in the steering angle and setting a desired current value to zero when the steering angle reaches the rack end angle, it becomes possible to prevent a situation that a large shock is applied to the steering mechanism. That is to say, as indicated in a dashed line of FIG. 5, within a range AR from the given angle to the maximum steering angle that is the steering end, an armature current Ia of the motor gradually decreases, and the armature current Ia is controlled so as to become zero, furthermore, a steering torque Lp that is an assist torque applied by the motor gradually decreases with an increase in a load torque, and becomes equal to a steering torque Tm during a manual operation in the maximum steering angle of the steering wheel, so the motor is not driven in the stroke end portion of the steering wheel, it is possible to prevent occurrences of an overload status of the motor and a heat generation within the motor, and simultaneously it is possible to reduce the power consumption. That is, the apparatus described in Patent Document 1, decreases the desired current value in the case that the steering angle is equal to or more than the given value, and aims at improving durability of the steering mechanism such as the intermediate shaft, the tie rods, the rack and pinion mechanism and the hub units and reducing the power consumption of the motor.

However, in the apparatus described in the above Patent Document 1, a mechanism that decreases the assist torque is consistently constant, no consideration is given to a thing that durability of the steering mechanism diminishes on a long-term basis, therefore the need of an improvement in permanent durability is requested.

The List of Prior Art Documents

Patent Documents

Patent Document 1: Japanese Examined Patent Application Publication No. H6-4417 B2

SUMMARY OF THE INVENTION

Problems to be Solved by the Invention

In the case that the rack when performing the steering assist hits the stopper (end hitting) or tires hit the curbstone, stress of the steering apparatus becomes high. Although the steering mechanism is designed to resist the above stress, along with a fact that an electric power steering apparatus is equipped with a larger-sized vehicle, there is a trend that the component parts get larger. Since the trend that the component parts get larger not only becomes cost rises but is not desirable for the vehicle as well, the appearance of an apparatus that the steering mechanism is not damaged even in the case that durability of the steering mechanism diminished on a long-term basis after performing weight saving and downsizing of the component parts, is desired.

The present invention has been developed in view of the above described circumstances, and an object of the present invention is to provide an electric power steering apparatus that realizes weight saving and downsizing of component parts by counting and controlling the number of times of end hitting and simultaneously calculating a current limit value depending on the number of times of end hitting to limit assist.

Means for Solving the Problems

The present invention relates to an electric power steering apparatus that calculates a current command value based on a steering torque detected by a torque sensor and a velocity and provides a steering system with an assist torque generated by a motor based on said current command value, the above-described object of the present invention is achieved by that comprising: an end hitting detection means that detects end hitting based on said steering torque and a differential steering torque obtained by differentiating said steering torque and outputs an end hitting detection signal; a counting means that counts a number 1 of times of end hitting detected by said end hitting detection means; a storage means that stores and keeps a total number of times of end hitting; and a current limit value calculating means that calculates a current limit value depending on a number 2 of times of end hitting obtained by adding said number 1 of times of end hitting from said counting means and said total number of times of end hitting from said storage means, wherein said current command value is limited based on said current limit value calculated by said current limit value calculating means.

The above-described object of the present invention is more effectively achieved by that wherein an output characteristic of said current limit value calculating means is constant before said number 2 of times of end hitting reaches a given value 1, and gradually becomes a linearly small value when said number 2 of times of end hitting exceeds said given value 1; or wherein an output characteristic of said current limit value calculating means is constant before said number 2 of times of end hitting reaches a given value 2, and gradually becomes a nonlinearly small value when said number 2 of times of end hitting exceeds said given value 2; or wherein an output characteristic of said current limit value calculating means is constant before said number 2 of times of end hitting reaches a given value 3, decreases to a constant value 1 in a staircase pattern when said number 2 of times of end hitting is within a range of said given value 3 to a given value 4 (said given value 4>said given value 3 holds), and decreases to a constant value 2 (said constant value 2<said constant value 1 holds) in a staircase pattern when said number 2 of times of end hitting exceeds said given value 4; or wherein an output characteristic of said current limit value calculating means decreases to a constant value 3 in a staircase pattern when said number 2 of times of end hitting exceeds a given value 5; or wherein said end hitting detection means comprises: a first comparison section for detecting that said steering torque exceeds a given steering torque value and outputting a detection signal 1; a second comparison section for detecting that said differential steering torque exceeds a given differential steering torque value and outputting a detection signal 2; a sign determining means for determining that signs of said steering torque and said differential steering torque are the same and outputting a determination signal; and an output means for outputting said end hitting detection signal when said determination signal is outputted; or wherein said storage means is a nonvolatile memory.

EFFECTS OF THE INVENTION

Since the electric power steering apparatus according to the present invention electrically detects end hitting that the rack hits the stopper, calculates a current limit value depending on the total number of times of end hitting, and limits the current command value, the voltage applied to the motor and so on by the calculated current limit value to reduce the assist torque, even in the case that durability of the steering mechanism diminished on a long-term basis, it is possible to realize a safe steering assist.

Further, since the electric power steering apparatus according to the present invention reduces the assist torque when the total number of times of end hitting has been increasing, the present invention has the advantage that it is possible to lower strength of the component parts and it is possible to realize weight saving and downsizing of the steering mechanism.

BRIEF DESCRIPTION OF THE DRAWINGS

In the accompanying drawings.

MODE FOR CARRYING OUT THE INVENTION

The main purpose of the present invention is to realize weight saving and downsizing of an electric power steering apparatus and improve durability of a steering mechanism such as an intermediate shaft, tie rods, a rack and pinion mechanism, hub units and so on. In order to achieve the above main purpose, the present invention counts and controls the number of times of end hitting that the rack hits the stopper and simultaneously calculates a current limit value depending on the number of times of end hitting to limit assist. To limit the assist, it is possible to limit an output torque of the motor, and it is also possible to limit a current command value, a steering torque, or a voltage applied to the motor, and so on.

Figure 6:
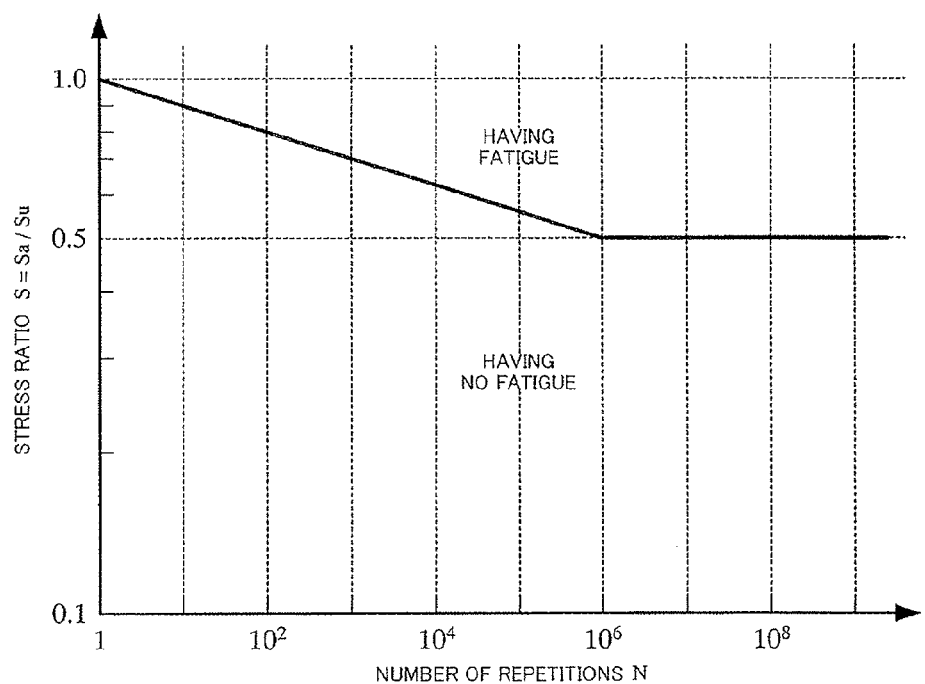
FIG. 6 is a diagram showing an example of an S-N curve.

In general, fatigue life characteristics of forged steels for machines that are used for component parts and materials of the steering mechanism, are represented by an S-N curve. As shown in FIG. 6, the S-N curve is a graph representing a characteristic that increasing in the number of times of loading with high stress causes fatigue failure by the number of repetitions (an x-axis) and loading stress (a y-axis). Stress ratio S is the ratio of actual stress Sa and stress of tensile strength Su, and is represented by "S=Sa/Su". Although with respect to this characteristic, the stress generally decreases depending on the number of repetitions, when the number of repetitions increases, the stress stabilizes (fatigue limit). FIG. 6 is the S-N curve of steels (carbon steels, high tensile strength steels, chromium molybdenum steels, and so on) and titanium, becomes a downward-sloping stress reduction characteristic before the number of repetitions reaches about $10^6$, and this thing means that the more the number of repetitions, the less stress causes fatigue. Further, FIG. 6 shows that when the number of repetitions becomes $10^6$ or more, even if the number of repetitions becomes an extremely large number, the stress causing fatigue does not change (fatigue limit). If being repetitive stress under the fatigue limit, even if it is unlimitedly applied, the fatigue does not happen, so the fatigue limit of a lot of steel is 50~60% of the tensile strength.

In the case that the rack when performing the steering assist hits the stopper (end hitting) or tires hit the curbstone, stress of an input system of the steering apparatus becomes high. Although the steering apparatus is designed to resist this stress, there is a trend that the component parts get larger. For this reason, the present invention reduces impact loads to act on the steering mechanism such as the intermediate shaft and so on during an end hitting of steering operations and simultaneously realizes weight saving and downsizing of the component parts, by decreasing the number of end hitting and assist output so as to be within a range where the steering mechanism does not cause metal fatigue by getting a handle on the total number of end hitting, that is, so as to coordinate with the S-N characteristic. In this way, even in the case that the durability of the steering mechanism diminished on a long-term basis, it is possible to realize a safe steering assist.

Hereinafter, embodiments of the present invention will be described with reference to the drawings.

Figure 1:
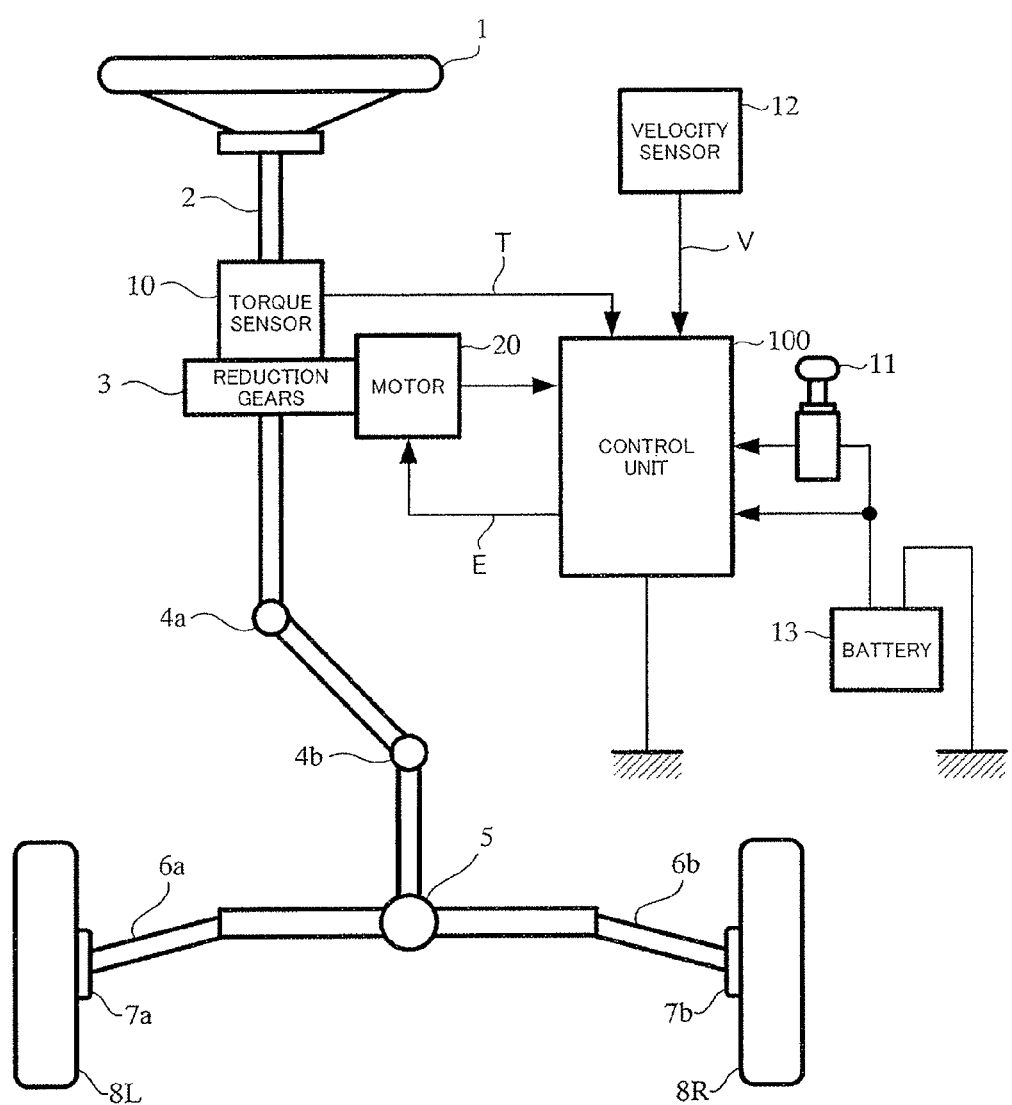
FIG. 1 is a diagram illustrating a configuration example of a general electric power steering apparatus.
Figure 2:
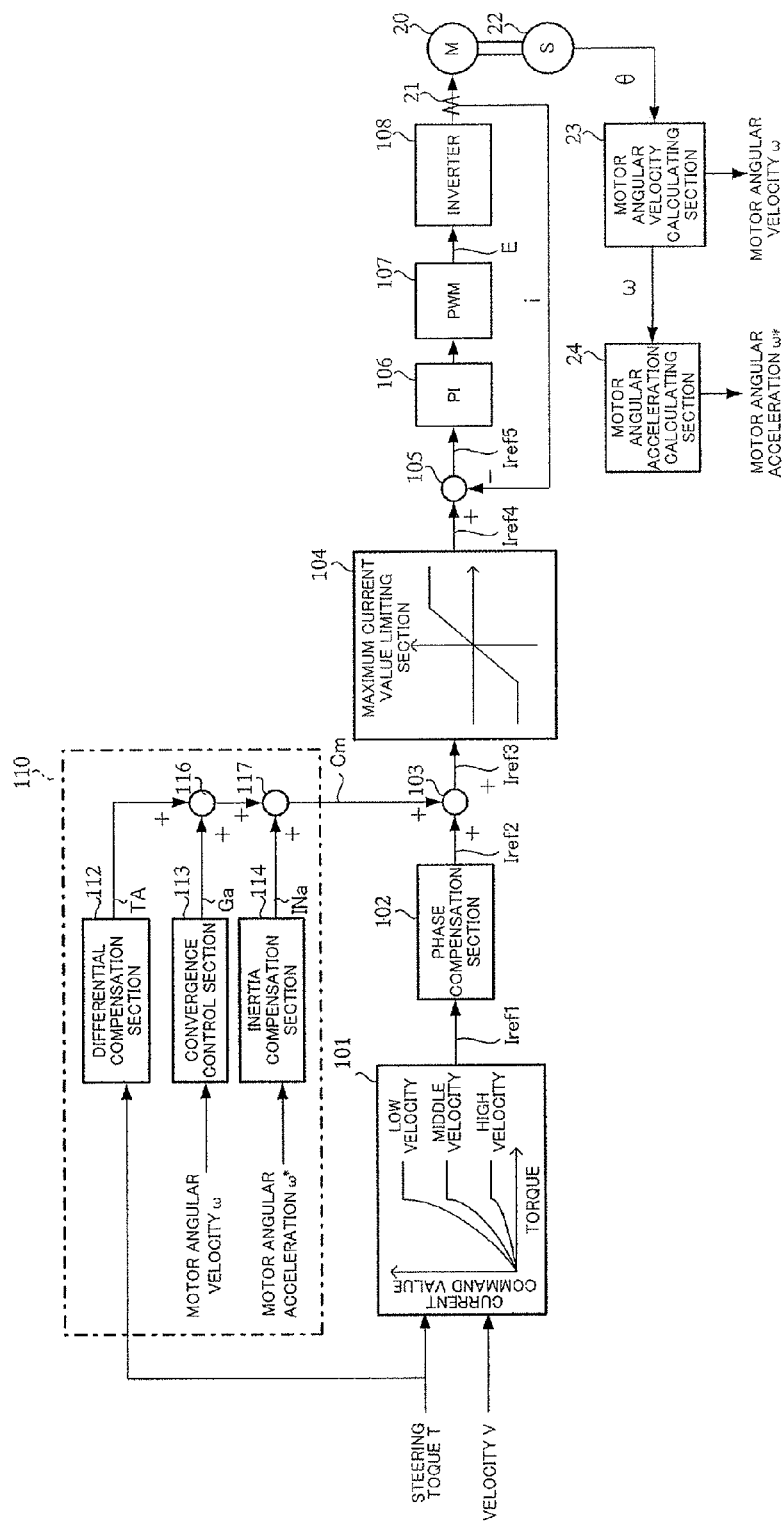
FIG. 2 is a block diagram showing an example of a control unit.
Figure 3:
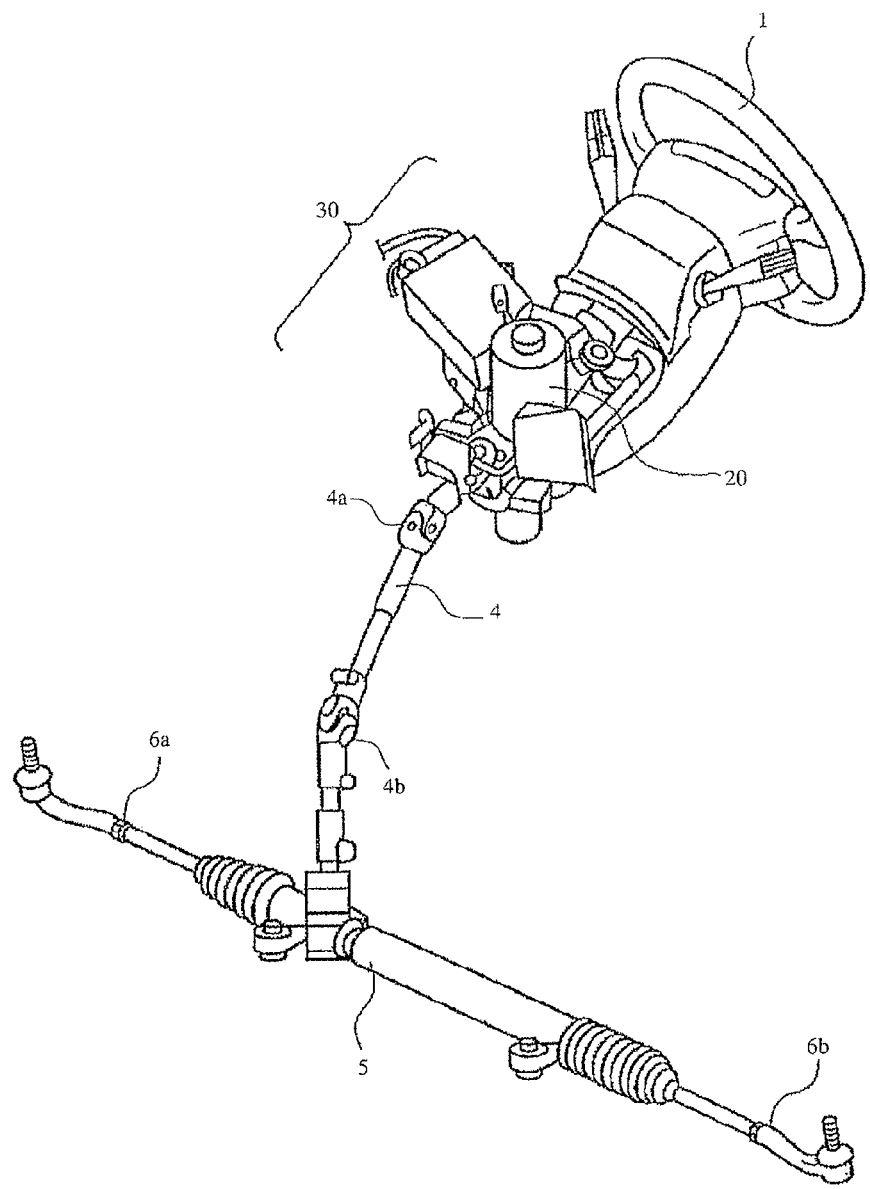
FIG. 3 is a mechanism diagram showing an example of an electric power steering apparatus comprising an intermediate shaft.
Figure 4:
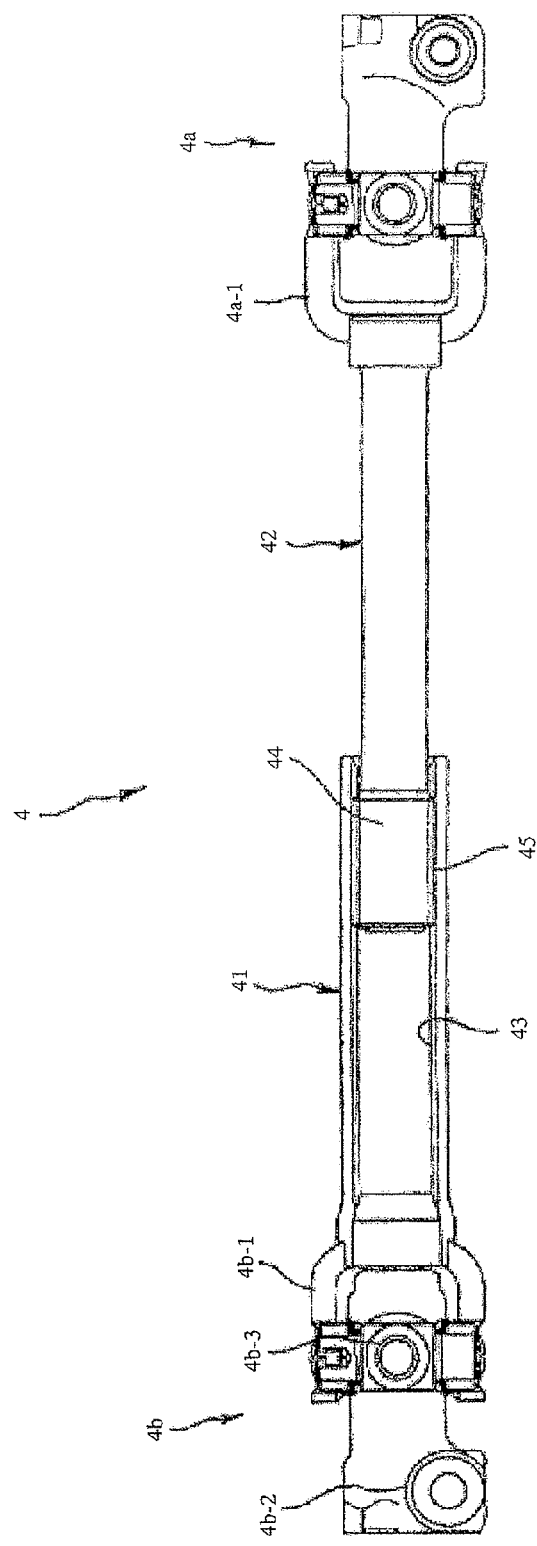
FIG. 4 is a mechanism diagram illustrating a detailed example of the intermediate shaft.
Figure 5:
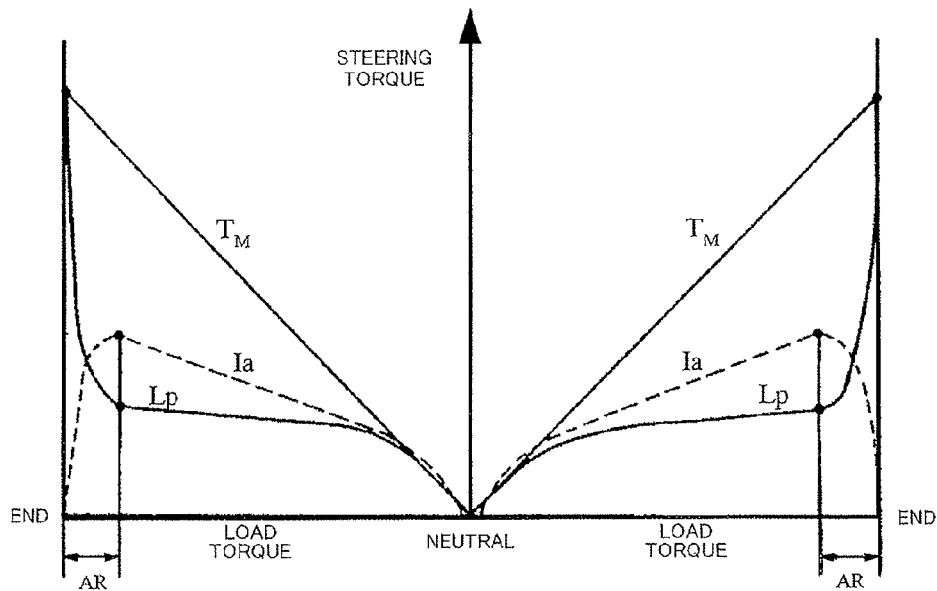
FIG. 5 is a characteristic diagram for explaining an operation example of a conventional apparatus.
Figure 7:
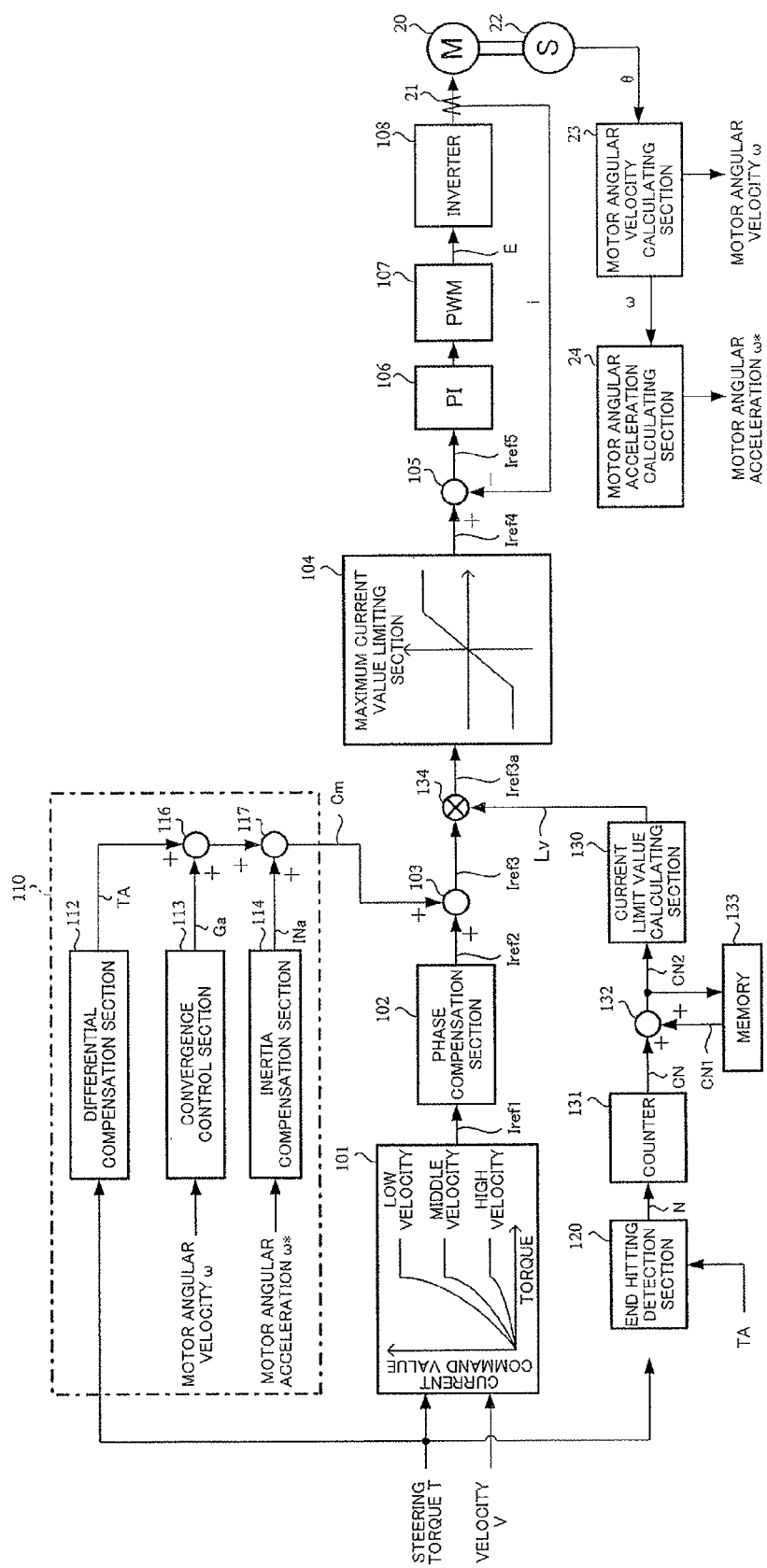
FIG. 7 is a block diagram showing an example of embodiments of the present invention.

FIG. 7 shows an example of embodiments of the present invention that corresponds to FIG. 2. As shown in FIG. 7, the present invention comprises an end hitting detection section 120 as an end hitting detection means that detects an end hitting that the rack hits the stopper, a counter 131 as a counting means that counts an end hitting detection signal N detected by the end hitting detection section 120, a memory 133 as a storage means that is capable of storing and reading out a counted value CN of the counter 131, an adding section 132 that adds a counted value CN1 that is read out from the memory 133 and the counted value CN of the counter 131, a current limit value calculating section 130 that inputs the number CN2 of times of end hitting that is obtained by the addition of the adding section 132 and calculates a current limit value Lv, and a multiplying section 134 that multiplies a current command value Iref3 by the current limit value Lv calculated by the current limit value calculating section 130 and limits the current command value Iref3. In addition, a current limit value calculating means comprises the current limit value calculating section 130 and the adding section 132, a current command value Iref3$a$ limited by the multiplying section 134 is inputted into a maximum current value limiting section 104, and subsequent operations are the same as the case of FIG. 2.

Figure 8:
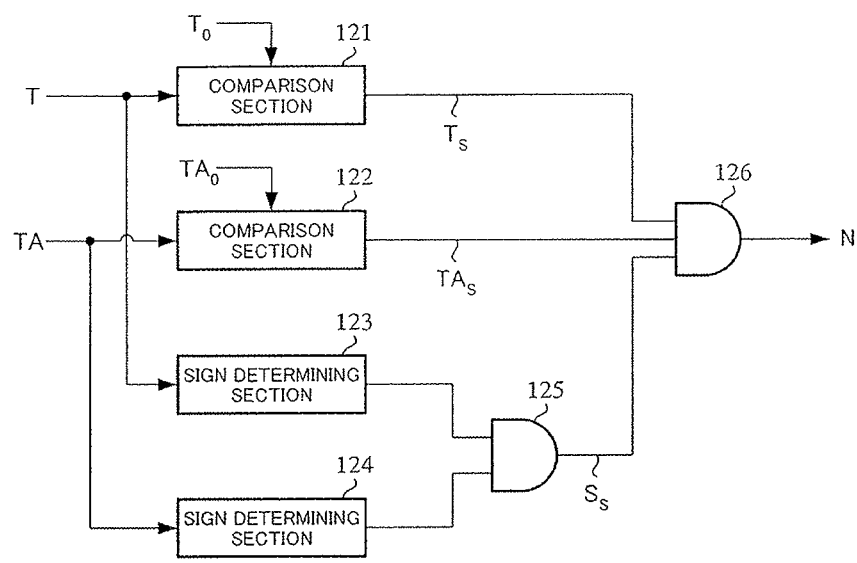
FIG. 8 is a block diagram showing a configuration example of an end hitting detection section.

Although the end hitting detection section 120 detects end hitting based on the steering torque T and the differential steering torque TA from the differential compensation section 112, a configuration example of the end hitting detection section 120 will be described with reference to FIG. 8.

The end hitting detection section 120 comprises a comparison section 121 that inputs the steering torque T, compares the inputted steering torque T with a given value $T_0$ as a threshold, and outputs a detection signal Ts when the steering torque T exceeds the given value $T_0$, a comparison section 122 that inputs the differential steering torque TA, compares the inputted differential steering torque TA with a given value $TA_0$ as a threshold, and outputs a detection signal TAs when the differential steering torque TA exceeds the given value $TA_0$, a sign determining section 123 that determines the sign of the steering torque T, a sign determining section 124 that determines the sign of the differential steering torque TA, an AND-circuit 125 that outputs a sign accordance signal Ss when the signs of the sign determining section 123 and the sign determining section 124 accord, and an AND-circuit 126 that when the detection signal Ts, the detection signal TAs and the sign accordance signal Ss are outputted, outputs the end hitting detection signal N after a given period of time elapses. An output means comprises the AND-circuit 125 and the AND-circuit 126. That is, if the detection signal Ts, the detection signal TAs and the sign accordance signal Ss are not simultaneously outputted, the end hitting detection signal N is not outputted from the AND-circuit 126.

Figure 9A:
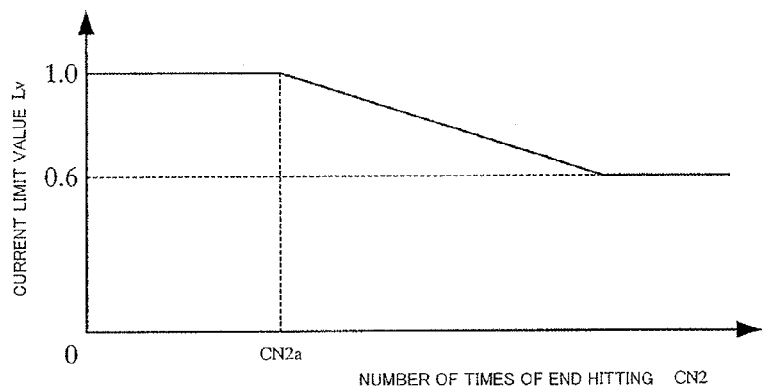
FIGS. 9A to 9D are diagrams showing various characteristic examples of a current limit value calculating section.
Figure 9B:
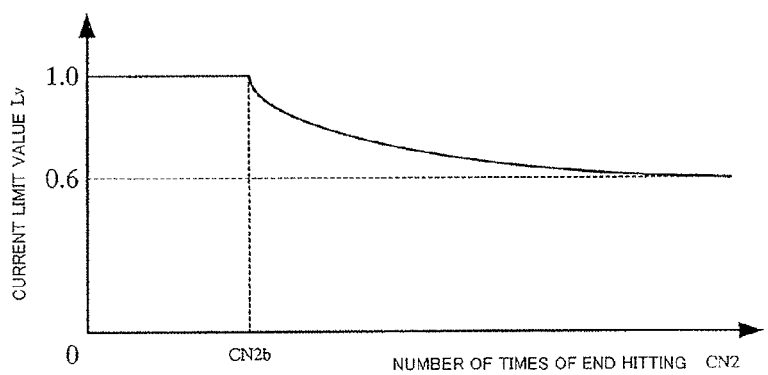
Figure 9C:
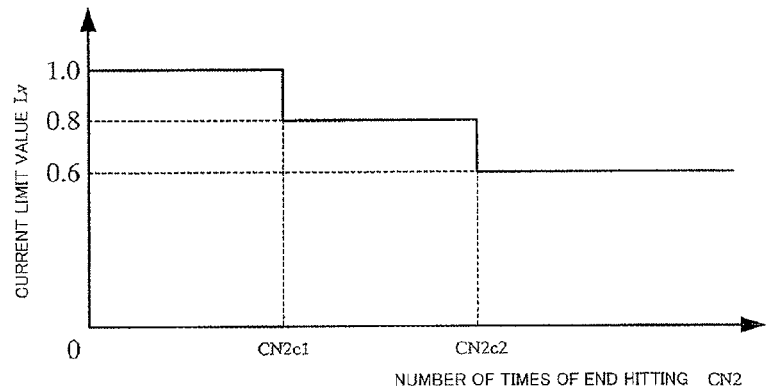
Figure 9D:
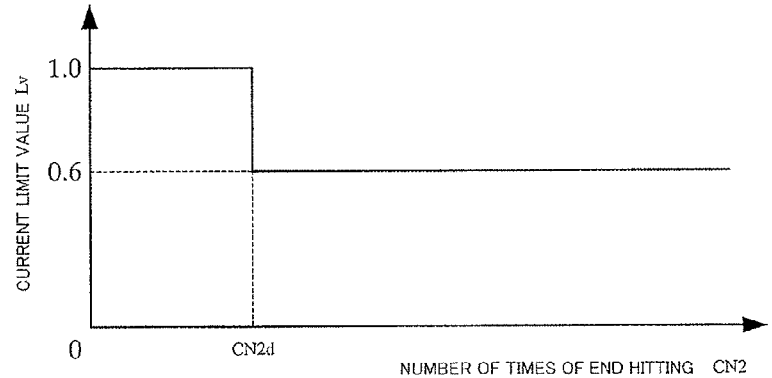

Further, the current limit value calculating section 130 calculates the current limit value Lv corresponding to the number CN2 of times of end hitting and outputs the calculated current limit value Lv. As shown in FIG. 9A, the current limit value Lv is "1.0" and constant before the number CN2 of times of end hitting reaches a given value CN2$a$, gradually becomes a linearly small value when the number CN2 of times of end hitting exceeds the given value CN2$a$, and finally converges on about "0.6". Further, FIG. 9B is another example, as shown in FIG. 9B, the current limit value Lv is "1.0" and constant before the number CN2 of times of end hitting reaches a given value CN2$b$, gradually becomes a nonlinearly small value when the number CN2 of times of end hitting exceeds the given value CN2$b$, and finally converges on about "0.6". Moreover, FIG. 9C shows an example that the current limit value Lv decreases multiple times in a staircase pattern (in this example, the current limit value Lv decreases in two stages), as shown in FIG. 9C, the current limit value Lv is "1.0" and constant before the number CN2 of times of end hitting reaches a given value CN2$c$1, is "0.8" when the number CN2 of times of end hitting is within a range of the given value CN2$c$1 to a given value CN2$c$2, and becomes "0. 6" when the number CN2 of times of end hitting exceeds the given value CN2$c$2. FIG. 9D shows an example that the current limit value Lv decreases in one stage in a staircase pattern, as shown in FIG. 9D, the current limit value Lv is "1.0" and constant before the number CN2 of times of end hitting reaches a given value CN2$d$, and decreases to "0.6" when the number CN2 of times of end hitting exceeds the given value CN2$d$. That is to say, in all four of the above examples, since the current limit value Lv becomes "1.0" before the number CN2 of times of end hitting reaches the given values CN2$a$, CN2$b$, CN2$c$1 or CN2$d$, the limitation of the current command value in the multiplying section 134, is not performed. For example, the memory 133 is a nonvolatile memory, is capable of storing the number CN2 of times of end hitting and reading out the number CN1 of times of end hitting that is stored when the power-supply is "ON", and even if the power-supply becomes "OFF", keeps the number CN2 of times of end hitting without deleting.

In such a configuration, the operation example will be described with reference to the flowchart of FIG. 10.

Figure 10:
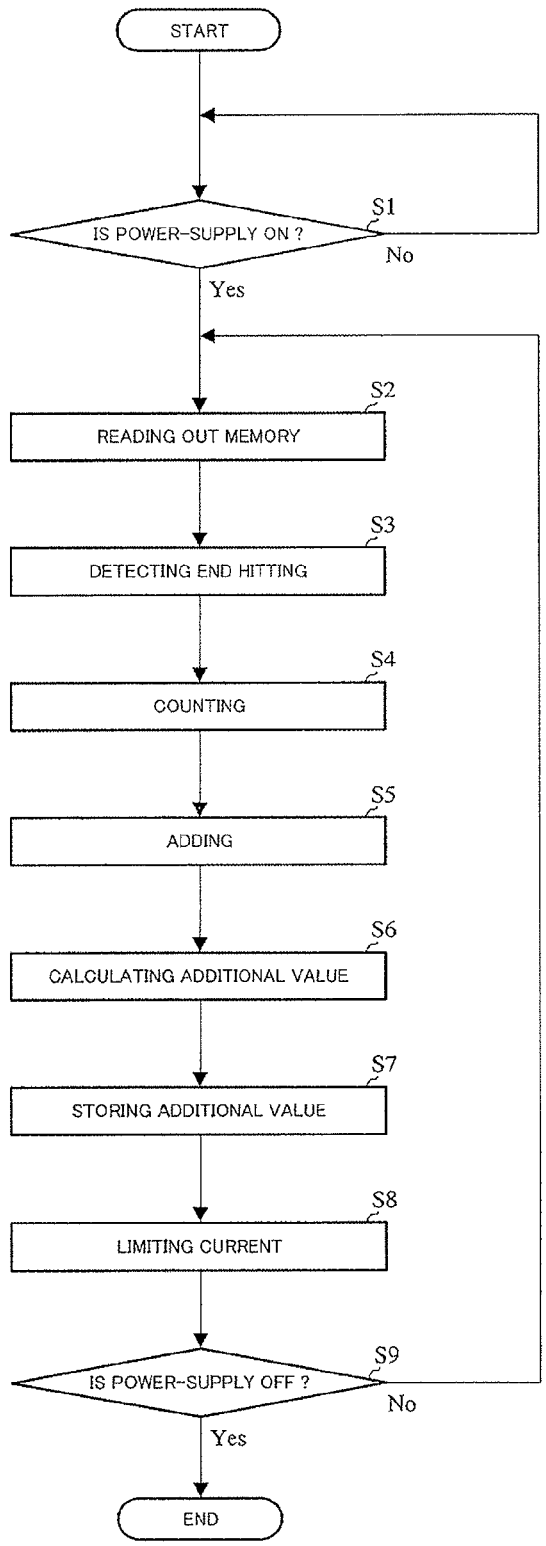
FIG. 10 is a flowchart showing an operation example of the present invention.

As shown in FIG. 10, when the power-supply becomes "ON" (Step S1) and the electric power steering apparatus becomes the drive status, the operations described in FIG. 2 are performed, and simultaneously the number CN1 of times of end hitting that is kept by the memory 133, is read out and is inputted into the adding section 132 (Step S2). Moreover, with respect to operations that are the same as FIG. 2, descriptions will be omitted.

The steering torque T from the torque sensor 10 and the differential steering torque TA from the differential compensation section 112 are inputted into the end hitting detection section 120, and the end hitting detection section 120 outputs the end hitting detection signal N when the steering torque T exceeds the given value $T_0$, the differential steering torque TA exceeds the given value $TA_0$, and the sign of the steering torque T and the sign of the differential steering torque TA accord (Step S3). That is to say, since the output of the sign determining section 123 and the output of the sign determining section 124 are the same in the case that the comparison section 121 outputs the detection signal Ts when the steering torque T exceeds the given value $T_0$, the comparison section 122 outputs the detection signal TAs when the differential steering torque TA exceeds the given value $TA_0$, and simultaneously the sign of the steering torque T and the sign of the differential steering torque TA accord, the end hitting detection signal N is outputted from the AND-circuit 126.

The end hitting detection signal N is counted by the counter 131 (Step S4), the counted value CN of the counter 131 and the number CN1 of times of end hitting that is read out from the memory 133 are added in the adding section 132 (Step S5), the total number CN2 of times of end hitting that is obtained by the addition of the adding section 132, is inputted into the current limit value calculating section 130, the current limit value calculating section 130 calculates the current limit value Lv depending on characteristics of FIG. 9 (Step S6), and simultaneously the total number CN2 of times of end hitting is stored in the memory 133 (Step S7).

The current limit value calculating section 130 calculates the current limit value Lv corresponding to the inputted number CN2 of times of end hitting, for example, in accordance with the characteristic of FIG. 9A, FIG. 9B, FIG. 9C and FIG. 9D. The calculated current limit value Lv is inputted into the multiplying section 134, identical or the reduced current command value Iref3a that is obtained by multiplying the current command value Iref3 is not performed. For example, the memory 133 is a nonvolatile ry, is capable of storing the numbered to realize reduction of the assist torque corresponding to the number CN2 of times of end hitting.

In this case, when the number CN2 of times of end hitting reaches the given values CN2a, CN2b, CN2c1 or CN2d, it is possible to store in an ECU as system errors of the electric power steering apparatus, display error information in vehicle maintenance, or warn the driver.

In addition, although the above-described embodiment limits the current limit value with respect to the current command value, if it is possible to limit the output characteristic of the motor, it is also possible to limit the steering torque, the voltage applied to the motor, and so on. Further, the method of limitation can be a subtraction process. Moreover, it is possible to execute the limitation only during detecting of end hitting, and it is also possible to execute the limitation after the elapse of a certain period of time from the end hitting detection.

Although the above-described embodiment performs detection of end hitting by using the steering torque and the differential steering torque, it is also possible to add a steering angular velocity to the detection condition and add that the steering angular velocity becomes equal to or less than a given value to AND condition.

EXPLANATION OF REFERENCE NUMERALS 1 steering wheel
2 column shaft (steering shaft)
3 reduction gears
4 intermediate shaft
5 rack and pinion mechanism
6a, 6b tie rod
7a, 7b hub unit
8L, 8R steered wheel
10 torque sensor
11 ignition key
12 velocity sensor
14 battery
20 motor
21 motor current detection means
22 rotation sensor
23 motor angular velocity calculating section
24 motor angular acceleration calculating section
30 drive mechanism unit
100 control unit
101 current command value calculating section
102 phase compensation section
103 adding section
104 maximum current value limiting section
105 subtracting section
106 PI control section
107 PWM control section
108 inverter
110 torque compensation section
112 differential compensation section
113 convergence control section
114 inertia compensation section
120 end hitting detection section
131 counter
133 memory
130 current limit value calculating section

The invention claimed is:

1. An electric power steering apparatus located on a vehicle that calculates a current command value based on a steering torque detected by a torque sensor and a velocity and provides a steering system with an assist torque generated by an assist torque motor based on said current command value, comprising:
said torque sensor and said assist torque motor both physically connected to a processor;
said processor including:
an end hitting detector:
that detects end hitting based on said steering torque and a differential steering torque obtained by differentiating said steering torque, and
that outputs an end hitting detection signal;
a counter that counts a number 1 of times of end hitting detected by said end hitting detector;
a memory that stores and keeps a total number of times of end hitting; and
a current limit value calculator that calculates a current limit value depending on a number 2 of times of end hitting obtained by adding said number 1 of times of end hitting from said counter and said total number of times of end hitting from said memory,
wherein an output characteristic of said current limit value calculator is constant before said number 2 of times of end hitting reaches a given value 1, and gradually becomes a linearly small value when said number 2 of times of end hitting exceeds said given value 1, and
wherein said current command value is limited based on said current limit value calculated by said current limit value calculator.

2. The electric power steering apparatus according to claim 1, wherein said end hitting detector comprises:
a first comparator that detects that said steering torque exceeds a given steering torque value and outputs a detection signal 1;
a second comparator that detects that said differential steering torque exceeds a given differential steering torque value and outputs a detection signal 2;
a sign determiner that determines that signs of said steering torque and said differential steering torque are the same and outputs a determination signal; and
an outputter that outputs said end hitting detection signal when said determination signal is outputted.

3. The electric power steering apparatus according to claim 2, wherein said memory is a nonvolatile memory.

4. An electric power steering apparatus located on a vehicle that calculates a current command value based on a steering torque detected by a torque sensor and a velocity and provides a steering system with an assist torque generated by an assist torque motor based on said current command value, comprising:
said torque sensor and said assist torque motor both physically connected to a processor;
said processor including:
an end hitting detector:
that detects end hitting based on said steering torque and a differential steering torque obtained by differentiating said steering torque, and
that outputs an end hitting detection signal,
wherein said end hitting detector further comprises:
a first comparator that detects that said steering torque exceeds a given steering torque value and outputs a detection signal 1;

a second comparator that detects that said differential steering torque exceeds a given differential steering torque value and outputs a detection signal 2;

a sign determiner that determines that signs of said steering torque and said differential steering torque are the same and outputs a determination signal; and an outputter that outputs said end hitting detection signal when said determination signal is outputted;

a counter that counts a number 1 of times of end hitting detected by said end hitting detector;

a memory that stores and keeps a total number of times of end hitting; and a current limit value calculator that calculates a current limit value depending on a number 2 of times of end hitting obtained by adding said number 1 of times of end hitting from said counter and said total number of times of end hitting from said memory, wherein said current command value is limited based on said current limit value calculated by said current limit value calculator.

5. The electric power steering apparatus according to claim 4, wherein said memory is a nonvolatile memory.

6. An electric power steering apparatus located on a vehicle that calculates a current command value based on a steering torque detected by a torque sensor and a velocity and provides a steering system with an assist torque generated by an assist torque motor based on said current command value, comprising:

said torque sensor and said assist torque motor both physically connected to a processor;

said processor including:

an end hitting detector:

that detects end hitting based on said steering torque and a differential steering torque obtained by differentiating said steering torque, and that outputs an end hitting detection signal;

a counter that counts a number 1 of times of end hitting detected by said end hitting detector;

a memory that stores and keeps a total number of times of end hitting; and a current limit value calculator that calculates a current limit value depending on a number 2 of times of end hitting obtained by adding said number 1 of times of end hitting from said counter and said total number of times of end hitting from said memory, wherein an output characteristic of said current limit value calculator is constant before said number 2 of times of end hitting reaches a given value 2, and gradually becomes a nonlinearly small value when said number 2 of times of end hitting exceeds said given value 2, and wherein said current command value is limited based on said current limit value calculated by said current limit value calculator.

7. The electric power steering apparatus according to claim 6, wherein said end hitting detector comprises:

a first comparator that detects that said steering torque exceeds a given steering torque value and outputs a detection signal 1;

a second comparator that detects that said differential steering torque exceeds a given differential steering torque value and outputs a detection signal 2;

a sign determiner that determines that signs of said steering torque and said differential steering torque are the same and outputs a determination signal; and an outputter that outputs said end hitting detection signal when said determination signal is outputted.

8. An electric power steering apparatus located on a vehicle that calculates a current command value based on a steering torque detected by a torque sensor and a velocity and provides a steering system with an assist torque generated by an assist torque motor based on said current command value, comprising:

said torque sensor and said assist torque motor both physically connected to a processor;

said processor including:

an end hitting detector:

that detects end hitting based on said steering torque and a differential steering torque obtained by differentiating said steering torque, and that outputs an end hitting detection signal;

a counter that counts a number 1 of times of end hitting detected by said end hitting detector;

a memory that stores and keeps a total number of times of end hitting; and a current limit value calculator that calculates a current limit value depending on a number 2 of times of end hitting obtained by adding said number 1 of times of end hitting from said counter and said total number of times of end hitting from said memory, wherein an output characteristic of said current limit value calculator is constant before said number 2 of times of end hitting reaches a given value 3, decreases to a constant value 1 in a staircase pattern when said number 2 of times of end hitting is within a range of said given value 3 to a given value 4 (said given value 4>said given value 3 holds), and decreases to a constant value 2 (said constant value 2<said constant value 1 holds) in a staircase pattern when said number 2 of times of end hitting exceeds said given value 4, and wherein said current command value is limited based on said current limit value calculated by said current limit value calculator.

9. The electric power steering apparatus according to claim 8, wherein said end hitting detector comprises:

a first comparator that detects that said steering torque exceeds a given steering torque value and outputs a detection signal 1;

a second comparator that detects that said differential steering torque exceeds a given differential steering torque value and outputs a detection signal 2;

a sign determiner that determines that signs of said steering torque and said differential steering torque are the same and outputs a determination signal; and an outputter that outputs said end hitting detection signal when said determination signal is outputted.

10. An electric power steering apparatus located on a vehicle that calculates a current command value based on a steering torque detected by a torque sensor and a velocity and provides a steering system with an assist torque generated by an assist torque motor based on said current command value, comprising:

said torque sensor and said assist torque motor both physically connected to a processor;

said processor including:

an end hitting detector:

that detects end hitting based on said steering torque and a differential steering torque obtained by differentiating said steering torque, and that outputs an end hitting detection signal;

a counter that counts a number 1 of times of end hitting detected by said end hitting detector;

a memory that stores and keeps a total number of times of end hitting; and a current limit value calculator that calculates a current limit value depending on a number 2 of times of end hitting obtained by adding said number 1 of times of end hitting from said counter and said total number of times of end hitting from said memory, wherein an output characteristic of said current limit value calculator decreases to a constant value 3 in a staircase pattern when said number 2 of times of end hitting exceeds a given value 5, and wherein said current command value is limited based on said current limit value calculated by said current limit value calculator.

11. The electric power steering apparatus according to claim 10, wherein said end hitting detector comprises:
- a first comparator that detects that said steering torque exceeds a given steering torque value and outputs a detection signal 1;
- a second comparator that detects that said differential steering torque exceeds a given differential steering torque value and outputs a detection signal 2;
- a sign determiner that determines that signs of said steering torque and said differential steering torque are the same and outputs a determination signal; and
- an outputter that outputs said end hitting detection signal when said determination signal is outputted.

12. An electric power steering apparatus located on a vehicle that calculates a current command value based on a steering torque detected by a torque sensor and a velocity and provides a steering system with an assist torque generated by an assist torque motor based on said current command value, the apparatus comprising:
- said torque sensor and said assist torque motor both physically connected to a processor;
- a memory configured to store a plurality of software instructions physically connected to said processor; and
- said processor configured to execute said plurality of software instructions, said plurality of software instructions comprising:
  - detecting end hitting based on said steering torque and a differential steering torque obtained by differentiating said steering torque;
  - outputting an end hitting detection signal;
  - counting a number 1 of times of end hitting detected;
  - storing a total number of times of end hitting; and
  - calculating a current limit value depending on a number 2 of times of end hitting obtained by adding said number 1 of times of end hitting and said total number of times of end hitting,
  - wherein an output characteristic of said calculated current limit value is constant before said number 2 of times of end hitting reaches a given value 1, and gradually becomes a linearly small value when said number 2 of times of end hitting exceeds said given value 1, and
  - wherein a current command value is limited based on said calculated current limit value.

13. A method of calculating a current command value for an electric power steering apparatus located on a vehicle based on a steering torque detected by a torque sensor and a velocity, the method comprising:
- detecting steering torque by said torque sensor that is physically connected to a processor;
- detecting, by said processor, end hitting based on said steering torque and a differential steering torque obtained by differentiating said steering torque;
- outputting an end hitting detection signal;
- counting, by said processor, a number 1 of times of end hitting detected;
- storing, in a memory that is physically connected to said processor, a total number of times of end hitting;
- calculating, by said processor, a current limit value depending on a number 2 of times of end hitting obtained by adding said number 1 of times of end hitting and said total number of times of end hitting,
  - wherein an output characteristic of said calculated current limit value is constant before said number 2 of times of end hitting reaches a given value 1, and gradually becomes a linearly small value when said number 2 of times of end hitting exceeds said given value 1, and
  - wherein a current command value is limited based on said calculated current limit value; and
- providing a steering system with an assist torque generated by a motor based on said current command value.

* * * * *